Patented June 10, 1952

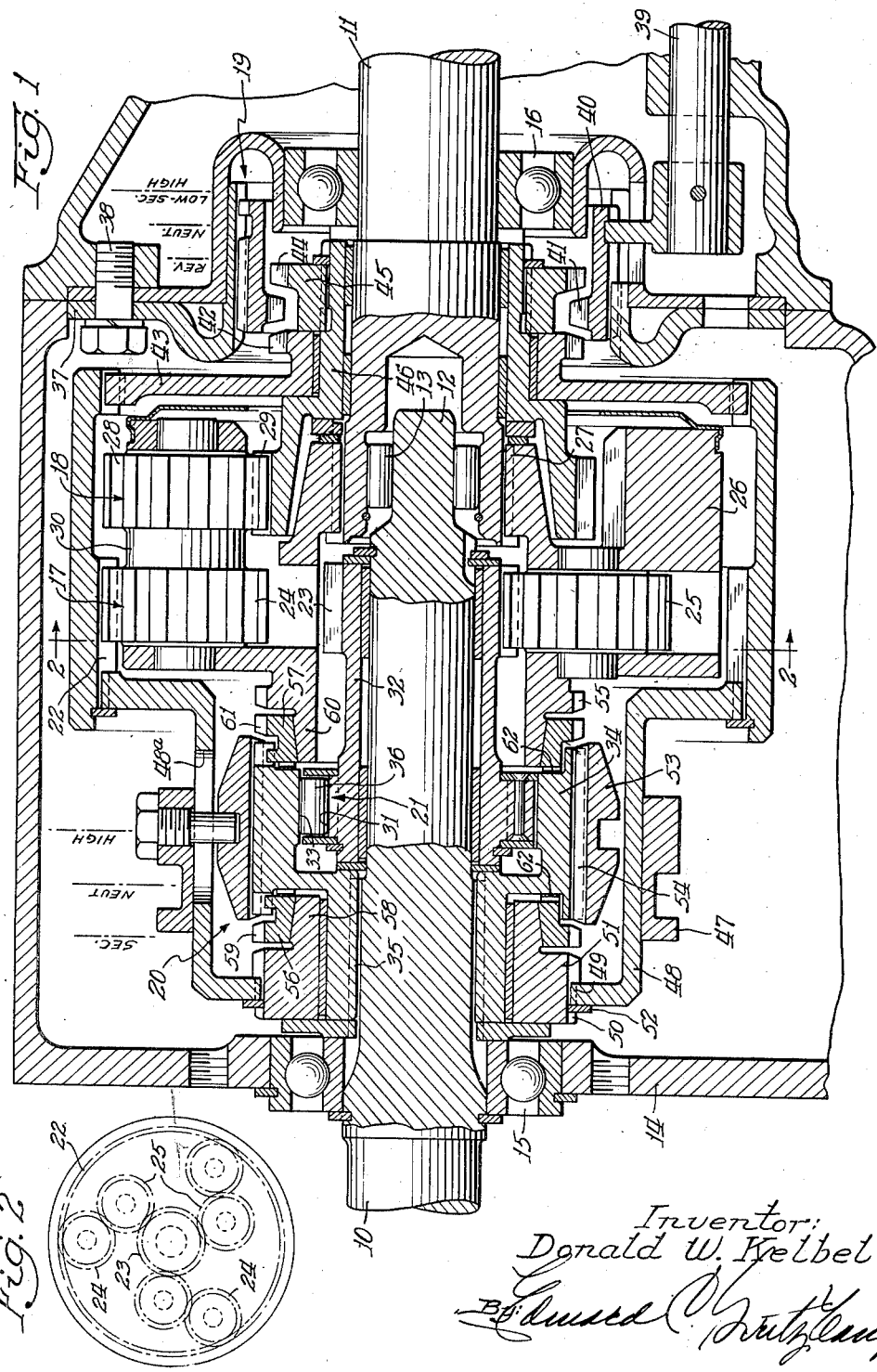

2,599,559

UNITED STATES PATENT OFFICE 2,599,559

TRANSMISSION

Donald W. Kelbel, Muncie, Ind., assignor to Borg-Warner Corporation, Chicago, Ill., a corporation of Illinois Application October 23, 1947, Serial No. 781,551

10 Claims. (Cl. 74—760)

This invention relates to variable speed transmissions and particularly to such transmissions employing planetary gearing.

The principal object of this invention is to provide a planetary transmission capable of producing three forward speeds corresponding to low, intermediate, and high speeds in the ordinary standard automobile three-speed transmission of the countershaft type, and also providing a reverse drive.

Another object of this invention is to provide a planetary transmission embodying a plurality of coupling elements selectively operable to establish three different forward drives and reverse drive, each element controlling one or more of the drives.

A further object of this invention is to provide an improved transmission employing planetary gear mechanism for providing forward and reverse drives between the input and output shafts of the transmission, and an overrunning clutch operatively connected between the shafts for transmitting either of the drives from the input shaft to the output shaft.

Another object of the invention is to provide a speed ratio changing mechanism having two movable control devices therefor, one of the devices being movable to a position wherein it serves to establish one of the three different forward speed ratios of which the transmission is capable while at the same time conditioning or preparing the mechanism so that it is merely necessary to selectively move the other control device to either of two positions to selectively establish the other two speed ratios of which the transmission is capable.

Another object of the invention is to provide a transmission of the type described above embodying an overrunning clutch device for free wheeling in one of the three available forward speed drives and which is rendered ineffective in the other two forward speed drives to enable the automobile to coast against the engine.

A further object of the invention is to provide an improved planetary transmission employing coupling mechanism embodying blocker type synchronizers effective in the establishment of a plurality of the forward speed ratios.

Another object of this invention is to provide an improved transmission which, while being of the complex planetary gear type, is of comparatively simple construction, efficient in operation, compact in assembly, and is readily adaptable for use with automatic controls or, if desired with manual selecting and shifting mechanism easily manipulated by the operator and which may be mounted for the operator's convenience, for example, on the steering column of an automobile.

This and other advantages of this invention will become apparent from the following descriptions when taken together with the accompanying drawings in which:

Fig. 1 is a longitudinal sectional view of a transmission embodying the principles of my invention, and Fig. 2 is a diagrammatic view taken along the section lines 2—2 of Fig. 1.

The drawing is to be understood as being more or less of a schematic character for the purpose of disclosing a typical or preferred embodiment of the improvements contemplated herein, and in the drawing, like reference characters identify the same parts wherever these parts appear in the several views.

Referring to the drawing, the transmission comprises a drive or input shaft 10 having suitable operative connections with a motor or engine (not shown) and a driven or output shaft 11 disposed in axial alignment with the drive shaft 10. The drive or input shaft 10 is provided with a reduced end 12 supported by pilot bearings 13 in a recess in the output shaft 11. The drive and driven shafts 10 and 11 are rotatably mounted within a stationary housing 14 having openings in its end wall to receive ball-bearing assemblies 15 and 16 for respectively journaling the adjacent portions of the shafts.

The transmission comprises a complex planetary gear set having cooperating offset sections generally designated at 17 and 18 respectively. A control device in the form of a toothed brake mechanism generally designated at 19 cooperates with an element of the gear set section 18 to provide low speed gear ratio, and with an element of the gear set section 17 to provide reverse gear ratio. A second control device 20 is in the form of a positive clutch mechanism of the blocker-synchronizer type and serves to provide intermediate and high speed gear ratios as will be described hereinafter. In addition, an overrunning clutch, generally designated 21, is instrumental in providing free wheeling in the low speed ratio and reverse drive conditions of the transmission and is rendered ineffective in the intermediate or high speed ratio conditions of the transmission to enable the car to coast against the engine in these variable speed ratios as will be more clearly described as the description proceeds.

Describing the planetary gear sets 17 and 18 and the controls 19 and 20 therefor in detail, the planetary gear set 17 comprises a ring gear 22, a sun gear 23, and planet gears or pinions 24 and 25, said planet gears being rotatably mounted on a carrier 26 having a splined connection 27 to the output shaft 11. The planet gears are so arranged that ring gear 22 meshes with planet pinion 24 which in turn meshes with planet pinion 25, the latter being in mesh with the sun gear 23.

The planetary gear set 18 comprises planet gears or pinions, one of which is shown at 28, meshing with a sun gear 29 rotatably mounted on the output shaft 11. It may be noted from Fig. 1 that each planet pinion 28 is connected to and will rotate with an associated planet pinion 24 of the gear set 17 inasmuch as these gears are formed on a spool 30 having its ends rotatably mounted in the carrier 26. It will be apparent that rotation of the sun gear 23 or ring gear 22 of the gear set 17 will rotate the gears 24 and 28.

The overrunning or free-wheeling clutch unit 21 is of the cam-and-roller type and comprises an inner race or cam 31 provided on a sleeve 32 rotatably disposed on the drive shaft 10 and integral with the sun gear 23. An outer roller race 33 is provided on a portion of a hub 34 of the coupling device 20 and it may be noted that the hub 34 is splined as at 35 to the input shaft 10 for rotation therewith. The outer race 33 and inner race 31 have disposed therebetween the rollers 36 adapted, when the clutch is operative, to drivingly connect the input shaft 10 with the sun gear 23 of the planet gear set 17 and to release the connection in the event the sun gear 23 is rotated faster than the input shaft 10.

Referring to the brake and clutch device of the transmission for controlling the gear sets 17 and 18 to establish the various speed ratios and reverse drive, the coupling unit or brake device 19 comprises an annular element 37 having a flange at the radially outer peripheral region thereof secured to the transmission casing 14 by means of a plurality of bolts 38 and formed with an axially extending elongate opening receiving a shifter member or rail 39 extending into a groove in a sleeve 40 splined to the element 37 for axial shifting movement of the sleeve. The sleeve 40 is provided with teeth 41 selectively engageable with teeth 42 of an annular casting 43 connected to the ring gear 22 of the planet gear set 17 to hold the ring gear stationary for effecting reverse drive or engageable with teeth 44 on a collar 45, splined to a sleeve 46 rotatably mounted on the output shaft 11 and carrying the sun gear 29 of the planetary gear set 18, to hold sun gear 29 stationary to establish low speed ratio.

The coupling unit or clutch device 20 comprises a sleeve 47 mounted on a cylindrical casting 48 connected to the ring gear 22 and having a splined connection 49 with teeth 50 on a collar 51 rotatably mounted on sleeve 35 connected to the input shaft 10. The casting 48 is restrained against axial movement by retainer elements 52 as shown. The sleeve 47 has threaded therein a bolt extending through an elongated opening 48a in the casting 48 and received within a shift collar 53 splined to the hub 34 and axially movable thereon for engagement of its teeth 54 with the teeth 50 to connect the input shaft 10 to the ring gear 22 for establishing second speed ratio or for engagement of its teeth 50 with the teeth 55 formed on the planet carrier 26 to connect the input shaft with the planet carrier 26 to establish high speed ratio, when the coupling unit or brake device 19 is operative to hold stationary the sun gear 29 of the gear set 18.

Blocker-type synchronizers are employed with the clutch device 20 and comprise blocker rings 56 and 57 on opposite sides of the hub 34 of the clutch. The blocker ring 56 is provided with a tapered bore receiving a correspondingly tapered synchronizer cone 58 of the clutch member 51 with which it is adapted to frictionally engage to synchronize the speeds of the clutch collar 51 and shift collar 53 whenever the shift collar 53 is moved to the left in Fig. 2. The teeth 59 of the synchronizer ring 56 and teeth 50 on the clutch collar 51 are adapted to be aligned and engage the teeth 54 of the shift collar 53 after synchronization of the speeds of the clutch member 51 and the hub 34 has occurred. The blocker ring 57 is also provided with a tapered bore for receiving a correspondingly tapered synchronizer cone 60 formed on the carrier 26. The blocker ring 57 is adapted to be frictionally engaged with the synchronizer cone 60 to synchronize the speeds of the input shaft 10 and the carrier 26 when the shift collar 53 is moved to the right in Fig. 1 for engagement of its teeth 54 with the teeth 61 on the ring 57 and teeth 55 on the carrier 26. The blocker rings 56 and 57 may be urged into frictional engagement with the cones 58 and 60, respectively, in any desired manner and as an example, I have shown in Fig. 1 spreader springs 62 of flat spring steel utilized for this purpose and constantly acting on the blocker rings to engage the friction faces thereof under light pressure with the cones to normally maintain the rings in blocking position.

Describing now the operation of the transmission for effecting first, second and third speed ratios and reverse drive, the transmission and its controls are shown in a neutral position in the drawing, the drive shaft 10 being rotated in clockwise direction when viewed from the left of Fig. 1 and rotating the collar 35 which, through its connection to the outer race 33 of the overrunning clutch 21, will cause the sleeve 32 to rotate in a similar direction and with it the sun gear 23 which will be effective to rotate the planet gears of the planet gear sets 17 and 18 without, however, imparting drive to the output shaft 11.

To establish first or low speed ratio, the sleeve 40 of the brake device 19 is moved to the right so that the teeth 41 thereof mesh with teeth 44 of the collar 45 to hold the latter and thereby the sun gear 29 against rotation. Sun gear 29 is thus held stationary and establishes a reaction to the rotation of the planet gears 28 of the gear set 18 and thereby the planet gears 24 and 25 of the gear set 17 to cause the planet carrier 26 to transmit drive to the driven shaft 11. The drive will be from the input shaft 10 to the outer member 33 of the overrunning clutch which is splined thereon, the outer race member 33 then driving the inner race member 31 through the medium of the free-wheel rollers 36 and, since the inner race member 31 and sun gear 23 are formed on the sleeve 32, the sun gear 23 will effect rotation of the meshing double planet gears 24 and 25 of the planetary gear set 17, and thereby the gear 28 of the planetary gear set 18, which, through the reaction afforded by its meshing engagement with the stationary sun gear 29, will cause rotation of the planet carrier 26 and thereby the driven shaft 11 in a clockwise direction. More particularly, it will be noted from an inspection of Fig. 2 that the sun gear 23 will cause the planet gears 24 and 28 of the spool 30 to planetate about the sun gear 23 in the same direction as the sun gear but at a reduced speed. These planet gears will thereby carry the planetary cage 26 with them at reduced speed and, since the planetary cage is fixed to the output shaft 11, the output shaft 11 will rotate or turn in low gear ratio.

To establish second or intermediate speed ratio, the brake device 19 is maintained effective to prevent rotation of the sun gear 29 as described above and the sleeve 47 of the clutch device 20 is moved to the left in Fig. 1 to engage the teeth 54 of the shift collar 53 with the teeth 59 on the synchronizer ring 56 and the teeth 50 of the collar 51. As the brake device 19 is effective to maintain the sun gear 29 stationary, the sun gear 29 will continue to act as a reaction point, as in low speed position, but the drive will now be from the input shaft 10 through the synchronizer hub 34 and shift collar 53 to the cylindrical casting 48 upon which the ring gear 22 is mounted, the ring gear thus acting as the driver and, since the sun gear 29 is held stationary, the planetary cage 26 will be driven forward at a speed less than that of the ring gear causing the driven shaft to be driven in a clockwise direction at a speed substantially reduced with respect to the speed of rotation of the driven shaft 10. Second speed or intermediate speed ratio is thus established, and it may be noted that the sun gear 23 will idle under these circumstances inasmuch as the sun gear will be driven forward at a speed greater than that of the input shaft 10, and accordingly, the freewheeling clutch 21 will overrun.

To provide third speed ratio or direct drive, sleeve 40 of the brake device 19 is maintained with its teeth 41 in engagement with the teeth 44 to hold the sun gear 29 stationary and the shift collar 53 is moved by the sleeve 47 to the right to engage the teeth 54 of the shift collar 53 with the teeth 61 of the synchronizer ring 57 and teeth 55 on the carrier 26. The input shaft 10 is thus connected to the carrier 26, and, in this condition of the transmission, the drive will be from the input shaft 10 through the hub 33 and shift collar 53 of the clutch device 20 to the planetary gear cage 26 and to the output shaft 11. It will thus be apparent that the output and input shafts 10 and 11 respectively are directly connected together through the means of the clutch device 20 and planet gear carrier 26 for direct drive. It may be noted that the ring gear 22 will idle in a forward direction at an overdrive speed ratio and the sun gear 23 will again be driven forward at a speed greater than the speed of the input shaft 10, under which circumstances the free-wheeling clutch 21 will overrun.

It may be noted that the coupling unit or brake device 19 is operative to hold the sun gear 29 stationary to condition the transmission mechanism to provide intermediate and high speed ratios. More specifically, the brake device 19 must initially be rendered effective to hold the sun gear 29 stationary before either of these speed ratios can be established by movement of the clutch collar 53 of the clutch device 20 to couple the input shaft 10 to the ring gear 22 or to couple the planet carrier 26 to the input shaft 10. Thus, the term "condition" contemplates the sequential operation of two devices controlling different elements of a transmission mechanism, both of which elements must be controlled to establish the speed ratio of the mechanism with one of the devices being initially operative to control one of the elements prior to completion of the establishment of the speed ratio by the other element being controlled by the other device.

Reverse drive is effected by movement of the collar 40 of the brake device 19 to the left to mesh the teeth 41 of the collar 40 with the teeth 42 connected to the ring gear 22 to hold the ring gear stationary, the shift collar 53 of the clutch device 20 having previously been shifted to neutral position as shown in Fig. 1. A drive will then be established from the input shaft 10 through the hub 33 of the clutch device 20, which forms the outer race member of the overrunning clutch 21, and then to the rollers 36 and inner race member 31 of the clutch 21 to the sun gear 23. Sun gear 23 thus will become the driver of the planetary gear sets 17 and 18 and, since the ring gear 22 is held stationary, the planetary cage or carrier 26 will be driven backwards or in a counterclockwise direction and thereby will rotate the output shaft 11 in a similar direction or reversely with respect to that of the input shaft 10.

It may be noted from the foregoing description that low speed ratio and reverse drives are through the overrunning clutch 21 to permit free wheeling in these two drives, whereas, in the second or intermediate and third or high speed ratio drives, the overrunning clutch 21 is not effective to transmit drive from the input to the output shaft so that the car is enabled to coast against the engine. Also, the clutch 21 is operative in the low gear ratio drive and reverse drive conditions of the transmission to transmit drive from the input shaft to the output shaft.

While the selecting and shifting means under the control of the operator of the motor vehicle for effecting movement of the shift rail 39 of the brake device 19 and the shift collar 47 of the clutch device 20 are not shown in the drawings, it will be apparent that these members for effecting the three speed ratios and reverse drive are adaptable for use with instrumentalities of such mechanism connected to the rail 39 and shift collar 47, which may be automatically operated by vacuum controls, or which may be manually operated, for example, by a lever or Bowden wire connected to the rail 39 and actuable by the driver to place the transmission in condition for forward or reverse drive, and a lever under the control of the operator connected to the shift collar 47 and movable to shift the collar into either its intermediate or high speed positions.

While this invention has been described in detail in its present preferred form or embodiment, it will be apparent to persons skilled in the art after understanding the improvements, that various changes and modifications may be made therein without departing from the spirit or the scope thereof. It is aimed in the appended claims to cover all such changes and modifications.

I claim:

1. A transmission comprising input and output shafts, planetary gear mechanism operatively connected between said shafts and adapted to provide a plurality of variable speed ratios, said mechanism comprising first and second sun gears, a ring gear, meshing planet pinions one in mesh with said first sun gear and the other in mesh with said ring gear, a planet gear rotatable with one of said planet pinions and meshing with said second sun gear, a common carrier for said planet gear and pinions and connected to said output shaft, a one-way coupling connecting said first sun gear with said input shaft, means for holding said second sun gear against rotation to establish a power train including said one-way coupling providing one of said speed ratios, and means for connecting said input shaft to said ring gear to establish a power train providing the other speed ratio when said holding means is operative.

2. A transmission comprising input and output shafts, planetary gear mechanism operatively connected between said shafts and adapted to provide a plurality of variable speed ratios, said mechanism comprising first and second sun gears, a ring gear, meshing planet pinions one in mesh with said first sun gear and the other in mesh with said ring gear, a planet gear rotatable with one of said planet pinions and meshing with said second sun gear, a common carrier for said planet gear and pinions and connected to said output shaft, a one-way coupling connecting said first sun gear with said input shaft, means for holding said second sun gear against rotation to establish a power train including said one-way coupling providing one of said speed ratios, and means for connecting said input member to said carrier to establish a power train providing the other speed ratio when said holding means is operative.

3. A transmission comprising input and output shafts, planetary gear mechanism operatively connected between said shafts and adapted to provide a plurality of variable speed ratios, said mechanism comprising first and second sun gears, a ring gear, meshing planet pinions one in mesh with said first sun gear and the other in mesh with said ring gear, a planet gear rotatable with one of said planet pinions and meshing with said second sun gear, a common carrier for said planet gear and pinions and connected to said output shaft, a one-way coupling connecting said first sun gear with said input shaft, means for holding said second sun gear against rotation to establish a power train including said one-way coupling providing one of said speed ratios, and means for selectively connecting said input shaft to said ring gear or said carrier to establish either of two power trains providing two other different speed ratios when said holding means is operative.

4. A transmission comprising input and output shafts, first and second planetary gear sets providing low and high speed power trains between said shafts, said first set comprising meshing planet pinions, a sun gear in mesh with one of said pinions, and a ring gear in mesh with the other of said pinions, said second set comprising a sun gear, a planet gear connected to one of the pinions of said first set for rotation therewith, and a common carrier for said planet gear and pinions and connected to said output shaft, a one-way coupling connecting the sun gear of the first set with said input shaft, and means for holding the sun gear of said second set stationary to provide said low speed power train including said one-way coupling, and means for releasably connecting said ring gear to said input member when said holding means is operative to provide said high speed power train, release of said connecting means automatically establishing said low speed power train.

5. A transmission comprising input and output shafts, first and second planetary gear sets providing low, intermediate and high speed power trains between said shafts, said first set comprising meshing planet pinions, a sun gear in mesh with one of said pinions, and a ring gear in mesh with the other of said pinions, said second set comprising a sun gear, a planet gear connected to one of pinions of said first set for rotation therewith, and a common carrier for said planet gear and pinions and connected to said output shaft, a one-way coupling connecting the sun gear of the first set with said input shaft, and means for holding the sun gear of said second set stationary to provide said low speed power train including said one-way coupling, and means for selectively connecting said input shaft to said ring gear to establish said intermediate speed ratio or to said carrier to establish said high speed ratio.

6. A transmission comprising input and output shafts, first and second planetary gear sets providing two different power trains between said shafts, said first set comprising meshing planet pinions, a sun gear in mesh with one of said pinions, and a ring gear in mesh with the other of said pinions, said second set comprising a sun gear, a planet gear connected to one of the pinions of said first set for rotation therewith, and a common carrier for said planet gear and pinions and connected to said output shaft, a one-way coupling connecting the sun gear of the first set with said input shaft, and means for holding the sun gear of said second set stationary to provide one of said power trains including said one-way coupling, and means for releasably connecting said ring gear to said input member when said holding means is operative to provide the other of said power trains, release of said connecting means automatically establishing said one power train.

7. A transmission comprising input and output shafts, first and second planetary gear sets providing a plurality of power trains between said shafts, said first set comprising meshing planet pinions, a sun gear in mesh with one of said pinions, and a ring gear in mesh with the other of said pinions, said second set comprising a sun gear, a planet gear connected to one of the pinions of said first set for rotation therewith, and a common carrier for said planet gear and pinions and connected to one of said shafts, a one-way coupling connecting the sun gear of the first set with the other of said shafts, and means for holding the sun gear of said second set stationary to provide one of said power trains including said one-way coupling, and means for selectively connecting said one shaft to said ring gear or to said carrier to establish either of two other of said power trains.

8. In a transmission, an input shaft, an output shaft, planetary gear mechanism operatively disposed between said shafts and capable of establishing low speed, intermediate speed, and direct drive forward gear ratio power trains and a reverse speed gear ratio power train between said shafts, said mechanism comprising relatively rotatable members including a first sun gear, a second sun gear, a ring gear, and a planet gear carrier, an overrunning clutch disposed between said input shaft and said first sun gear and common to said low speed gear ratio and reverse speed gear ratio power trains and effective to transmit torque from the input shaft to the output shaft when either of said latter trains is effective, a brake device common to said forward speed gear ratio power trains for holding said second sun gear against rotation when any one of said forward speed power trains is effective, and a positive clutch device selectively operable to connect said input shaft to said ring gear to establish said intermediate speed gear ratio while said brake device is effective, or to connect said input shaft to said planet carrier to establish said direct drive gear ratio.

9. In a transmission, an input shaft, an output shaft, planetary gear mechanism operatively disposed between said shafts and capable of establishing low speed, intermediate speed, and direct drive forward gear ratio power trains and a reverse speed gear ratio power train between said shafts, said mechanism comprising relatively rotatable members including a first sun gear, a second sun gear, a ring gear, and a planet gear carrier, an overrunning clutch disposed between said input shaft and said first sun gear and common to said low speed gear ratio and reverse speed gear ratio power trains and effective to transmit torque from the input shaft to the output shaft when either of said latter trains is effective, a brake device common to said forward speed gear ratio power trains for holding said second sun gear against rotation when any one of said forward speed power trains is effective, and a positive clutch device selectively operable to connect said input shaft to said ring gear to establish said intermediate speed gear ratio while said brake device is effective, or to connect said input shaft to said planet carrier to establish said direct drive gear ratio, said brake device being operable to hold said ring gear against rotation to establish reverse speed gear ratio.

10. In a transmission, the combination of an input shaft, an output shaft, a planetary gear mechanism connecting said shafts and including a first sun gear, a second sun gear, a ring gear, and a planet gear carrier, means for braking either said ring gear or said first sun gear to condition the transmission respectively for either a reverse or a low forward speed power train between said shafts, a first connecting means for connecting said second sun gear to said input shaft to complete either said reverse or low forward speed power train between said shafts, a second connecting means for connecting said ring gear to said input shaft to establish an intermediate forward speed power train between said shafts, and a third connecting means for connecting said planet gear carrier to said input shaft to establish a high forward speed power train between said shafts, each of said connecting means being selectively operable.

DONALD W. KELBEL.

REFERENCES CITED

The following references are of record in the file of this patent:

UNITED STATES PATENTS

| Number | Name | Date |
| --- | --- | --- |
| 1,256,373 | Rowledge | Feb. 12, 1918 |
| 1,843,195 | Banker | Feb. 2, 1932 |
| 2,058,802 | Kamper | Oct. 27, 1936 |
| 2,067,897 | Banker | Jan. 19, 1937 |
| 2,214,335 | Kurti | Sept. 10, 1940 |
| 2,346,365 | Duffield | Apr. 11, 1944 |
| 2,395,459 | Carnagua | Feb. 26, 1946 |
| 2,410,921 | Avila | Nov. 12, 1946 |
| 2,519,050 | Kelbel | Aug. 15, 1950 |
| 2,528,584 | Farkas | Nov. 7, 1950 |

FOREIGN PATENTS

| Number | Country | Date |
| --- | --- | --- |
| 5,835 | Great Britain | Mar. 11, 1907 |